March 14, 1967 — M. A. SCHALL — 3,308,863

NUT CRACKER

Filed Sept. 11, 1964

INVENTOR.
MIKE A. SCHALL

3,308,863
NUT CRACKER
Mike A. Schall, Box 46, Rugby, N. Dak. 58368
Filed Sept. 11, 1964, Ser. No. 395,861
1 Claim. (Cl. 146—13)

This invention relates to nut cracking devices and is specifically directed to the provision of a nut cracker which incorporates certain new and novel improvements over conventional tools of this class.

The principal problem which is experienced when cracking nuts is damage to the kernal caused by the jaws crushing the same after the nut shell has yielded to the necessary crushing load. I have found that this problem can be substantially eliminated by the construction of a plier shaped tool wherein one of the jaws is substantially removed leaving only a single tooth or barb adjacent the root of the jaw. This modification enables extremely high loads to be concentrated at any desired point on the shell, and upon yielding to this crushing load, the jaw moves only a short distance towards the opposing jaw and cannot readily break the kernel contained within the shell.

It is, therefore, a primary object of this invention to provide a new and improved nut cracker which requires a minimum of effort to use and which rarely damages the kernel contained within the shell.

It is a further object of this invention to provide a nut cracker device which is simple in construction, rugged and efficient in operation, and which performs effectively to open all classes of nut.

Further objects and advantages of this invention will become apparent from the following more detailed description of a preferred embodiment thereof, taken in conjunction with the attached drawings wherein.

Similar reference characters indicate corresponding parts throughout the several views in the drawings.

Figure 1:
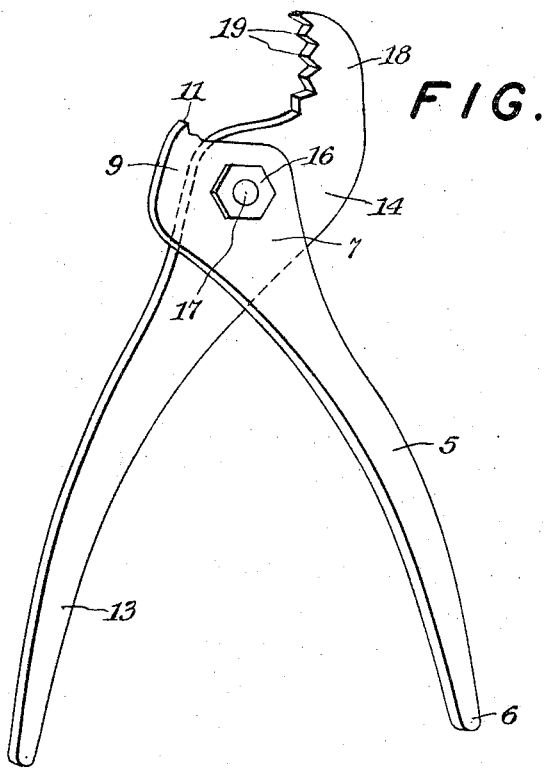
FIG. 1 is a perspective view of the nut cracker shown in the open position.
Figure 2:
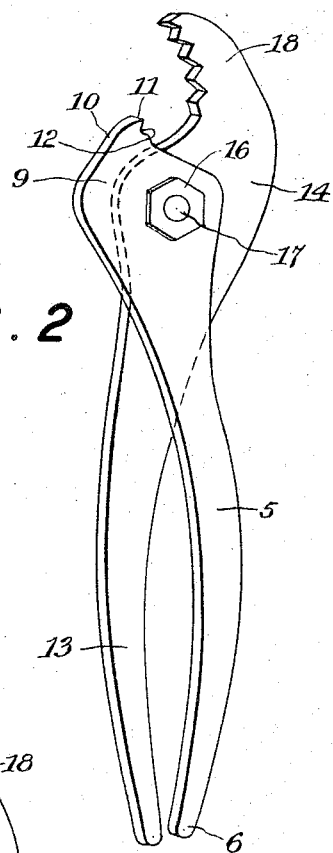
FIG. 2 is a perspective view of the nut cracker shown in a substantially fully closed condition.
Figure 3:
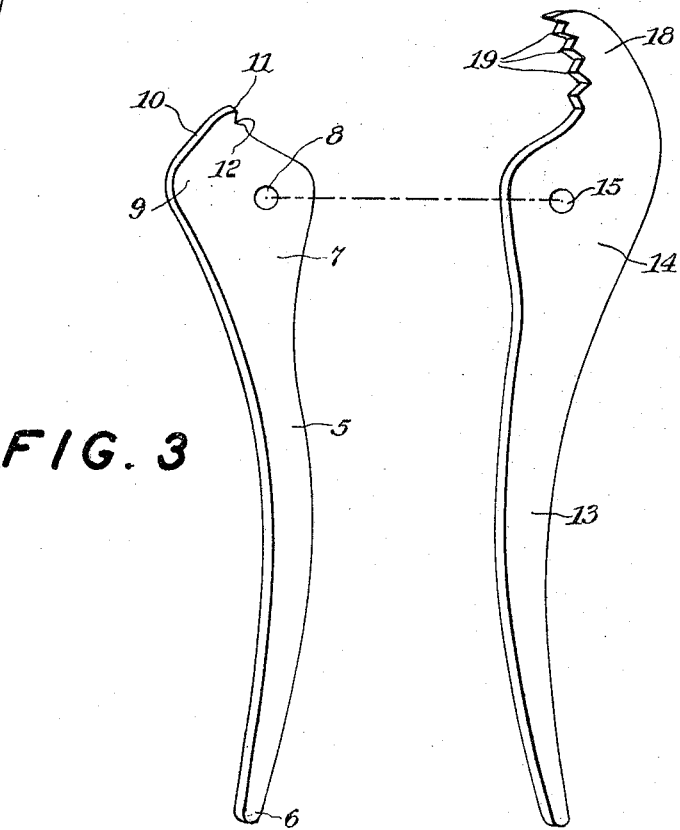
FIG. 3 is a plan view of the small jaw and depending handle.
Figure 4:
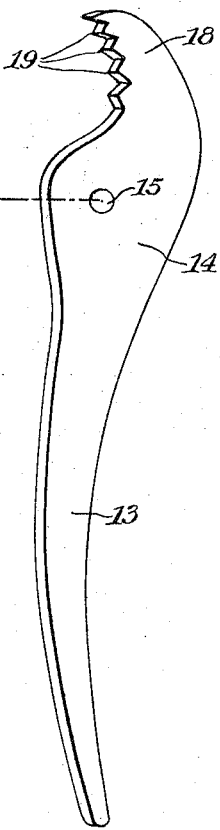
FIG. 4 is a plan view of the large jaw and depending handle.

Referring now to the drawings in detail, the numeral 5 represents a handle or lever which extends in a slightly arcuate manner and tapers at one end to form a substantially blunt nose 6. The handle is substantially flat and becomes enlarged towards its other end to form a flat bearing plate 7 having a hole 8 formed substantially through the centre thereof. Extending beyond the bearing plate 7 is a small jaw 9 defined by a substantially arcuate outer edge 10 having its centre of curvature in the vicinity of the hole 8. The arcuate outer edge of the small jaw terminates with a single tooth 11 which extends in the direction of the outer edge and is further disposed substantially from the extended line of curvature formed by the lever 5. The tooth 11 is further defined by a small recess 12 formed inwardly adjacent thereto.

A second handle or lever 13 of similar configuration to the handle 5, has a flat bearing plate surface 14 which is adapted to overlappingly engage across the bearing plate 7. A hole 15 is formed through the plate 14 and registers with the hole 8 to receive a nut and bolt 16 and 17 respectively. The bolt acts as a fulcrum about which the levers 5 and 13 may pivot to actuate the jaws disposed on the other end thereof. The bearing plate 14 extends in a direction opposite to that of the lever to form a serrated jaw 18. This jaw has a series of five or more teeth 19 which are arranged in a concave arc directed towards the small jaw 9. The innermost tooth 19 is positioned in substantially the same radial relationship with respect to the bolt 17 as that of the single tooth 11, and so it will be seen that the serrated jaw performs merely as a gripping support for the nut whilst the single tooth 11 performs to puncture and crush a small outer section of the shell which is disposed between the said single tooth and the lowermost tooth of the serrated jaw 18.

The two levers 5 and 13 are disposed in an opposed concave relationship to each other such that the blunt nose 6 will engage with the equivalent end area of the lever 13 when the small single jaw tooth 11 is spaced in the vicinity of half an inch from the lowermost tooth of the serrated jaw 18. In this way the single tooth 11 cannot readily crush the kernel inside the nut and will merely fracture and crush the outer shell structure.

The precise setting of the nut between the jaws will depend partly on the type of nut to be crushed, but it will be found that nuts can be crushed successfully without damage to the kernel from almost any initial orientation of grip on the shell.

From the foregoing, it is believed that the construction, operation and advantages of this invention will be fully apparent. However, since numerous modifications may occur to those skilled in the art, it is not desired to limit the construction exactly to that shown and described, and accordingly, modifications and equivalents may be resorted to, falling within the scope of the appended claim.

I claim:

A nut cracking device, comprising, two levers, flat bearing plates formed towards one end of each lever, said plates positioned in an overlapping relationship in abutment with each other, a bolt extending through aligned holes formed in said plates to permit a pivotal movement between the levers, a large jaw extending from one of said plates, arcuately extending teeth protruding from one side of the jaw, and arranged in a concave arc a small jaw extending from the other plate and terminating with a single tooth directed towards the large jaw, a small recess being formed inwardly adjacent the single tooth, said single tooth being restrained from contact with the teeth of the large jaw and being directed towards the innermost of said teeth.

References Cited by the Examiner
UNITED STATES PATENTS

| | | | |
|---|---|---|---|
| 636,587 | 11/1899 | Sylvester | 81—426 X |
| 1,782,364 | 11/1930 | Nation | 81—426 X |
| 2,071,897 | 2/1937 | Pazzano | 81—5.1 X |

WILLIAM W. DYER, Jr., *Primary Examiner.*
W. GRAYDON ABERCROMBIE, *Examiner.*